United States Patent
Goyal et al.

(10) Patent No.: US 10,776,351 B2
(45) Date of Patent: Sep. 15, 2020

(54) AUTOMATIC CORE DATA SERVICE VIEW GENERATOR

(71) Applicant: SAP SE, Walldorf (DE)

(72) Inventors: Kritika Goyal, Ratlam (IN); Alok Chhabria, Raipur (IN)

(73) Assignee: SAP SE, Walldorf (DE)

( * ) Notice: Subject to any disclaimer, the term of this patent is extended or adjusted under 35 U.S.C. 154(b) by 365 days.

(21) Appl. No.: 15/841,722

(22) Filed: Dec. 14, 2017

(65) Prior Publication Data

US 2019/0188297 A1    Jun. 20, 2019

(51) Int. Cl.
*G06F 16/242* (2019.01)
*G06F 9/451* (2018.01)
*G06F 16/23* (2019.01)
*G06F 8/38* (2018.01)
*G06F 40/169* (2020.01)

(52) U.S. Cl.
CPC ............ *G06F 16/2428* (2019.01); *G06F 8/38* (2013.01); *G06F 9/451* (2018.02); *G06F 16/23* (2019.01); *G06F 40/169* (2020.01)

(58) Field of Classification Search
CPC ...... G06F 16/2428; G06F 40/169; G06F 8/38; G06F 16/23; G06F 9/451
See application file for complete search history.

(56) References Cited

PUBLICATIONS

Ferriero, How to create Smart Templates annotations within CDS views parts 1-3, pp. 1-44, May (Year: 2016).*
How to Implement Value Help (F4) with SAP UI5, 17 pages (Year: 2013).*
How to Create FPM Application consuming CDS view using ACT, 35 pages, (Year: 2014).*

* cited by examiner

*Primary Examiner* — Albert M Phillips, III
(74) *Attorney, Agent, or Firm* — Fish & Richardson P.C.

(57) ABSTRACT

Various embodiments of systems and methods for automatically generating core data service (CDS) view for customized user interface (UI) are described herein. The method includes receiving a request to automatically generate the CDS view for the customized UI. Based upon the customized UI at least one of the namely are generated: (i) one or more generic annotations describing generic metadata of the customized UI, (ii) one or more value-help annotations referring to table having values for one or more UI elements of the customized UI, and (iii) one or more UI annotations describing metadata of the one or more UI elements of the customized UI. The generated annotations are used to generate the CDS view for the customized UI. The generated CDS view is stored in a database.

17 Claims, 9 Drawing Sheets

AUTOMATIC CORE DATA SERVICE VIEW GENERATOR

BACKGROUND

Core data service (CDS) view refers to a semantic or conceptual data model in which data is represented in a logical way to relate to a real world. The data may present an entity or object (e.g., orders, employees, associate partners, address, products, etc.). A CDS view may define data structure to represent an entity and its semantic relationships with other entities or objects. The CDS view enables to consume semantically rich data models on database. A CDS view may be created using data from a database table or another CDS view. A CDS view may be defined using a structured query language (SQL)-based data definition language (DDL) with concepts such as associations to define relationships between data or objects. For example, a CDS view may define association or relation between two objects, namely "associate partner" (represented by a first database storing data for associate partners) and "address" (represented by a second database storing addresses of associate partners). The association between the two objects or the associated two database tables may be 1:1, N: 1, N:N, or 1:N (e.g., one associate partner may have multiple (N) addresses). The CDS view may include annotations (metadata) which define object properties. The CDS view may be used (e.g., read) to generate a user interface (UI) representing the object.

For developing an application (e.g., application including multiple UIs), a hierarchy of CDS views (e.g., one CDS view per UI) may be created, an open data (OData) service is created, and the CDS views are associated with the OData service. The OData service is an open protocol which allows to create and use query enabled application programming interface (API). A UI may be generated by reading a corresponding CDS view (including annotations) through an OData service. The UI may be generated based on the annotations defined in the CDS view of the UI. However, creating a separate CDS view (including annotations) for the different UIs may be an arduous task because: (i) developers are required to learn the concepts of annotations. e.g., according to the requirements of respective applications: and (ii) developers are required to code repetitive annotations within CDS view(s) of the UIs because the properties or metadata of various UI elements may be same (e.g., same annotations to be coded for two different UI elements and same annotations to be coded for same UI element used on different UIs, etc.). Further, the UIs which are generated based on the CDS views may not be pre-viewed until and unless an entire application is generated and executed. Therefore, it may be difficult to detect inaccuracies and/or errors in the CDS views of the UIs (e.g., wrong UI annotations coded within a CDS view, etc.) before the application is generated and executed.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Embodiments of techniques for user interface (UI) based automatic CDS view generator are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Application" refers to a program coded for specific purpose or use. For example, an application may refer to a program coded for tracking manufacturing process, maintaining user's information or record, etc. An application may include multiple user interfaces (UIs) and each UI comprises one or more UI elements, e.g., pull or drop-down menu, label, text field, etc. The application may be created and/or rendered by reading metadata of its various UIs and UI elements. The application generated and rendered by reading metadata of its UIs and UI elements are termed as metadata based application.

"Object" refers to a software model (including logic and data) representing real-world or virtual entities. For example, an object may represent an address, an associate partner, a user, etc. An object may have one or more properties or attributes, e.g., the object "address" may include attributes such as building name, street number, lane number, pin code, country, etc. Typically, an object comprises logic and/or data. The data refers to values of various attributes of the object. For example, for the object "address" the data may be values of attributes building name, street number, lane number, pin code, country, etc. The attribute and its corresponding data may be termed as metadata of the object.

"Object page" refers to a layout (UI) which represents or defines an object. For example, a UI which represents an object "associate partner" may be termed as "associate partner" object page. Similarly, there may be object page (UI) which represents an object "address". The objects (i.e., object pages) may be associate or related. For example, there may be 1:N relation between the object page "associate partner" and "address". i.e., 1 associate partner may have multiple (N) different addresses. An object page may be rendered for a particular object instance. For example, the object page "associate partner" may be rendered for a particular object instance, e.g., associate partner "XYZ." The object page for a particular object instance includes information or data related to that object instance. An object page (UI) may include at least one of: (i) header which comprises critical information related to an object instance such as the definition of the object, the object instance status, etc.; (ii) line item or individual item (e.g., data in a row or column) which may be linked to or associated with another object page and through which user may navigate to another object page such as "address link" on the "associate partner" object page which may be linked to "address" object page; and (iii) field group which groups plurality of fields (UI elements) together under one heading, e.g., to form sections in a form or to consolidate semantically connected information.

"Value-help" refers to a feature which provides possible valid values for an input field (UI element) of a UI, e.g., in a pop-up dialog box. Typically, the value-help provides a list of values associated with a field or the UI element. For example, for the input field "associate partner", the value-help may provide names of all valid associate partners. The value-help may be referred as input help, selection help, or F4 help.

"Check table" refers to a table which is used to check if a data (e.g., provided in a input field) exists or not, i.e., whether the data is valid or not. If any field or any UI element have value from a table then that table may be marked or defined as check table. Typically, the value-help of the input field or UI element provides the list of values or valid values from the check table. In an aspect, the check table includes predefined values for a UI element or input field. For example, a check table (ASO_address) may provide valid or predefined addresses for a UI element "associate_partner_address" drop-down.

Core data service (CDS) view refers to semantic or conceptual data model in which data is represented in a logical way to relate to a real world. The data may be related to an entity or object such as orders, associate partners, address, or products, etc. A CDS view defines the object and its semantic relationships with other entities or objects. The CDS view may be created on top of a database table or another CDS view. The CDS view is defined using a structured query language (SQL)-based data definition language (DDL) with concepts such as associations to define relationship between objects or two CDS views. The object may be represented by database table (storing data of the object) and therefore, the CDS view may define association or relation between two database tables such as 1:1 or 1:N, etc. The CDS view also includes annotations or metadata (represented with prefix "@") of the object. The CDS view is a design-time file m the repository which may be read to generate corresponding UI. The CDS view may include (i) one or more generic annotations (represented or prefixed by "@") which describes generic feature of an object or UI, e.g. whether the object or UI is editable or not such as "@object-.editEnabled. True"; (ii) one or more value-help annotations (represented or prefixed by "@") which describes whether a UI element of the UI has value-help and its association with the check table such as "@object.foreignKeyAssociation, check-table_name"; and (iii) one or more UI annotations (represented or prefixed by "@UI") specific to a customized U which describes properties (e.g., visual, positional, and/or geometrical properties, etc.) of the UI element or the UI. e.g., whether the UI element is visible, label, text, hidden, etc., such as "@UI.fieldgroup1.Label:NAME". In various embodiments, the CDS view created for UI of specific application may be termed as "consumption CDS view." An exemplarily CDS view (namely: ASO_CDS) may be created for an UT representing the object "associate partner." The CDS view "ASO_CDS" may extract its data from a table (namely: ASOT) storing the information of valid associate partners and the CDS view "ASO_CDS" may be associated with another CDS view (namely: ASO_ADDRESS_CDS) having addresses of the associate partners. The association may be 1:N, i.e., 1 associate partner can have multiple addresses. The exemplarily CDS view "ASO_CDS" may be defined as:

```
Define ASO_CDS as SELECT from ASOT
Association [1: N] to ASO_ADDRESS_CDS
    { @object.editEnabled: True
        @U1.fieldgroupID= 1;
            @UI.fieldgroup.Position= 1;
            @UI.fieldgroup.Label = NAME;
            @object.foreignKeyAssociation: ASO_Name
            ASO_Name;        //is a table including valid names of all associate partners//
            @UI.fieldgroup.Position = 2;
            @UI.fieldgroup.Label= ID;
            @object.foreignKeyAssociation: ASO_ID
            ASO_ID;   //is a table including valid IDs of all associate partners//
        @U1.fieldgroupID= 2;
            @UI.fieldgroup.Position= 1;
            @UI.fieldgroup.Label = COMPANY:
            @object.foreignKeyAssociation: ASO_COMPANY;
            ASO_COMPANY; //is a table including valid company names of all associate partners//
            @UI.fieldgroup.Position= 2;
            @UI.fieldgroup.Label = AGE;
    }
```

"Annotation" refers to metadata which describes various properties or attributes of a UI and one or more UI elements. Annotations may be coded within the CDS view code. The annotations may be identified through a prefixed symbol "@". The annotations do not affect the operation of CDS view code that they annotate. Annotations, basically, enrich the data model with additional metadata and defines visual characteristics of the UI elements and the UIs, e.g., whether the UI is removable, or editable or whether the UI element is a label, etc.

"Open data (OData) protocol" refers to a data access protocol which may be built on protocol such as HTTP to address and access data resources including (but not limited to) relational databases, file systems (e.g., CDS view), content management systems, and traditional web sites. OData protocol may be representational state transfer (ReST) based data access protocol which relies on a client-server and cacheable communications protocol in which the HTTP protocol is used. It enables information to be accessed and exchanged from a variety of sources. A server may host data and clients may access, edit, manipulate, delete, etc., data from the server through OData protocol service (e.g., using GET data, DELETE data, etc.). The server exposes data through OData service and then the data may be consumed or used by clients or applications. For example, a metadata based application may consume data through OData service. The CDS views including metadata or annotations may be accessed or read through the OData service to generate one or more UIs/application.

"UI rendering engine" refers to a logical and/or physical unit which generates CDS view based user interfaces. The UI rendering engine reads the CDS view (including the generic annotations, value-help annotations, and/or UI annotations) through the OData service to generate the UI. The UI rendering engine may also be termed as "application rendering engine."

"Layout designer tool" refers to a graphic design tool (e.g., including one or more predefined UI elements) to arrange visual UI elements on a page or UI. The UI elements may be arranged on the page or UI using drag-and-drop operation. Typically, the layout designer tool lets a user (e.g., developer) arrange UI elements to design UIs or pages.

Embodiments provide an efficient way to automatically generate CDS views. The time and effort required in coding and creating CDS views is saved. Users (e.g., developers) can easily and quickly design one or more UIs as per requirement, e.g., using drag and drop facility provided on layout editor or designer and/or using one or more predefined templates. Based upon the user's designed or customized UIs, the CDS views (including required metadata or annotations) are automatically generated. As the CDS views and/or annotations are generated based upon the user's designed (actual intended) UIs, therefore, the CDS view and/or annotations are error-free and accurate. Further, as the CDS views and/or annotations are generated automatically (i.e., not required to be coded by the user), the time and effort required in coding CDS views is saved and the process of development of metadata based applications becomes more efficient. Moreover, the users (e.g., developers) need not have prior knowledge of CDS views and annotations and need not learn or be trained in coding CDS views and annotations for generating UIs and/or applications which saves training or learning time, effort, and cost.

Figure 1:
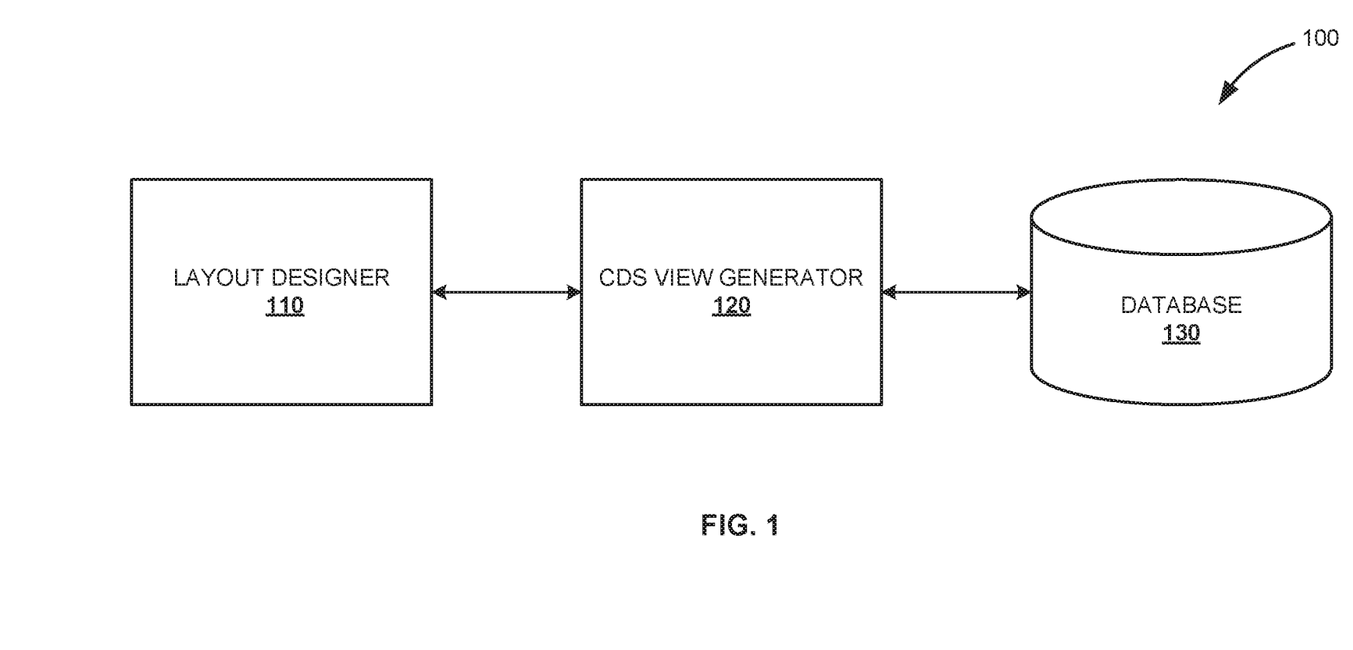
FIG. 1 is a block diagram illustrating exemplary user interface (UI) based core data service (CDS) view generation environment to automatically generate CDS views, according to an embodiment.

FIG. 1 is a block diagram illustrating exemplary user interface (UI) based core data service (CDS) view generation environment 100 for automatically generating CDS views, according to an embodiment. The UI based CDS view generation environment 100 comprises layout designer tool 110, CDS view generator 120, and database 130. A user (e.g., developer) may create a desired or intended UI on layout designer tool 110. The layout designer tool 110 provides various UI elements (e.g., text box, labels, icons, etc.) for designing or creating the UI. In an embodiment, the user may drag-and-drop the UI elements to create the UI. In an embodiment, an option may be provided to the user to create the UI by using or selecting predefined templates or CDS views. Therefore, the UI or customized UI may be created from scratch or using predefined templates or CDS views. In an embodiment, when the user selects the predefined CDS view, its corresponding UI may be rendered. The user may customize or edit the rendered UI per their requirement(s). For example, the user may reposition, edit, delete, etc., some of the UI elements of the rendered UI and/or add new UI elements from the layout designer tool 110 to the rendered UI. In an embodiment, when the selected CDS view or template has associations (e.g., has one or more associated CDS views), the one or more associated CDS views are also displayed to the user to make selection based on their requirement. In an embodiment, the user may edit or customize one or more UIs of the corresponding associated one or more CDS views. Once the UI is edited/customized by the user, the CDS view generator 120 automatically generates a CDS view (including various annotations) based upon the customized or edited UI. The generated CDS view, for the customized UI, is stored in the database 130.

Figure 2:
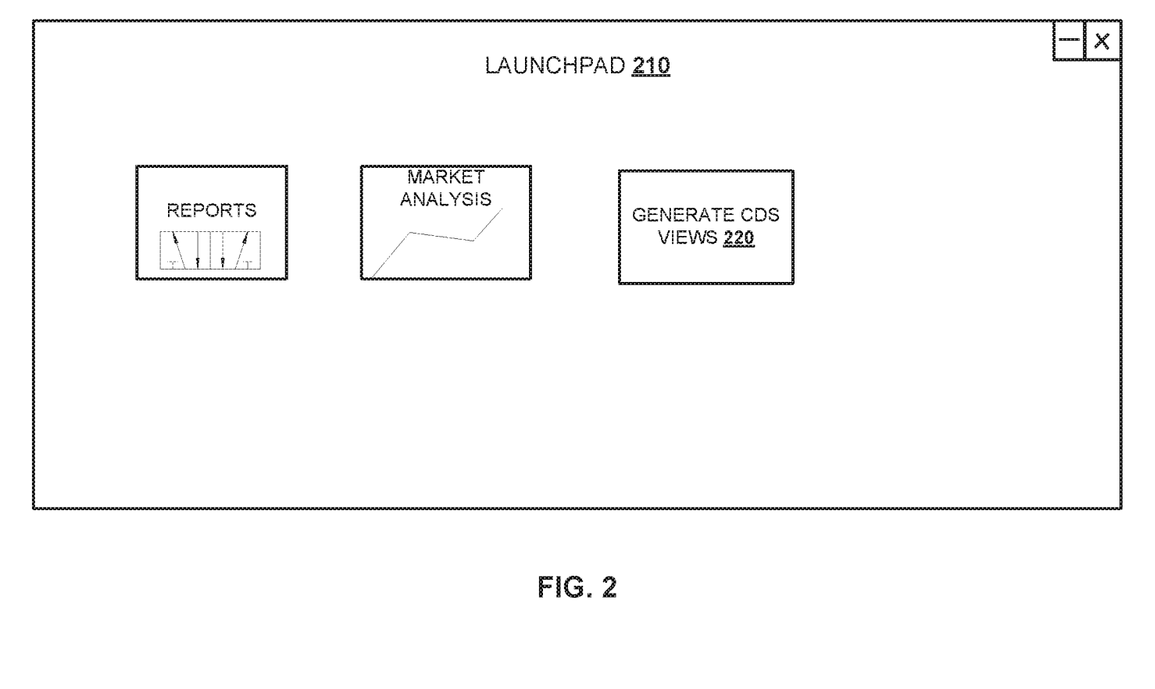
FIG. 2 illustrates an exemplarily user's launchpad including an option to automatically generate CDS views for customized UIs, according to an embodiment.

A user (e.g., a developer) may create or design an application comprising one or more UIs and the CDS views of the designed or customized UIs of the application may be automatically generated, e.g., for rendering the UIs or application. FIG. 2 illustrates an exemplarily user's launchpad 210 which includes an option (e.g., a tab) "generate CDS views" 220 to enable automatic generation of the CDS views corresponding to the user designed or customized UIs/application. In an embodiment, when the user selects the option "generate CDS views" 220, CDS view generator (e.g., the CDS view generator 120 of FIG. 1) gets activated to automatically generate CDS views for user defined UIs. In an embodiment, upon selection of the option "generate CDS views" 220, the user may be asked to enter a name of the CDS view to be generated. In an embodiment, once the name is entered by the user, a layout designer tool (not shown) including one or more UI elements or tools for designing or creating the UIs or application is displayed. The user may then create the customized UIs/application and the CDS views for the customized UIs are automatically generated. In an embodiment, once the name is entered by the user, one or more predefined templates or CDS views are displayed to select a layout for designing the UIs/application. The user may select the desired template or predefined CDS view. If the selected template or CDS view has one or more associations (e.g., one or more associated CDS views), the associated CDS views are also displayed for selection. For example, if a predefined CDS view "ASO_CDS" (i.e., generic CDS view for the "associate partner") is selected and it has an associated CDS view "ASO_ADDRESS_CDS" (i.e., generic CDS view for the "address" of the associate partners) then the associated CDS view "ASO_ADDRESS_CDS" is also displayed for selection. Once the user selects the template or the CDS view and its one or more associations (e.g., associated CDS views), the layout designer tool is displayed to create the customized UIs using the selected CDS views or templates.

Figure 3:
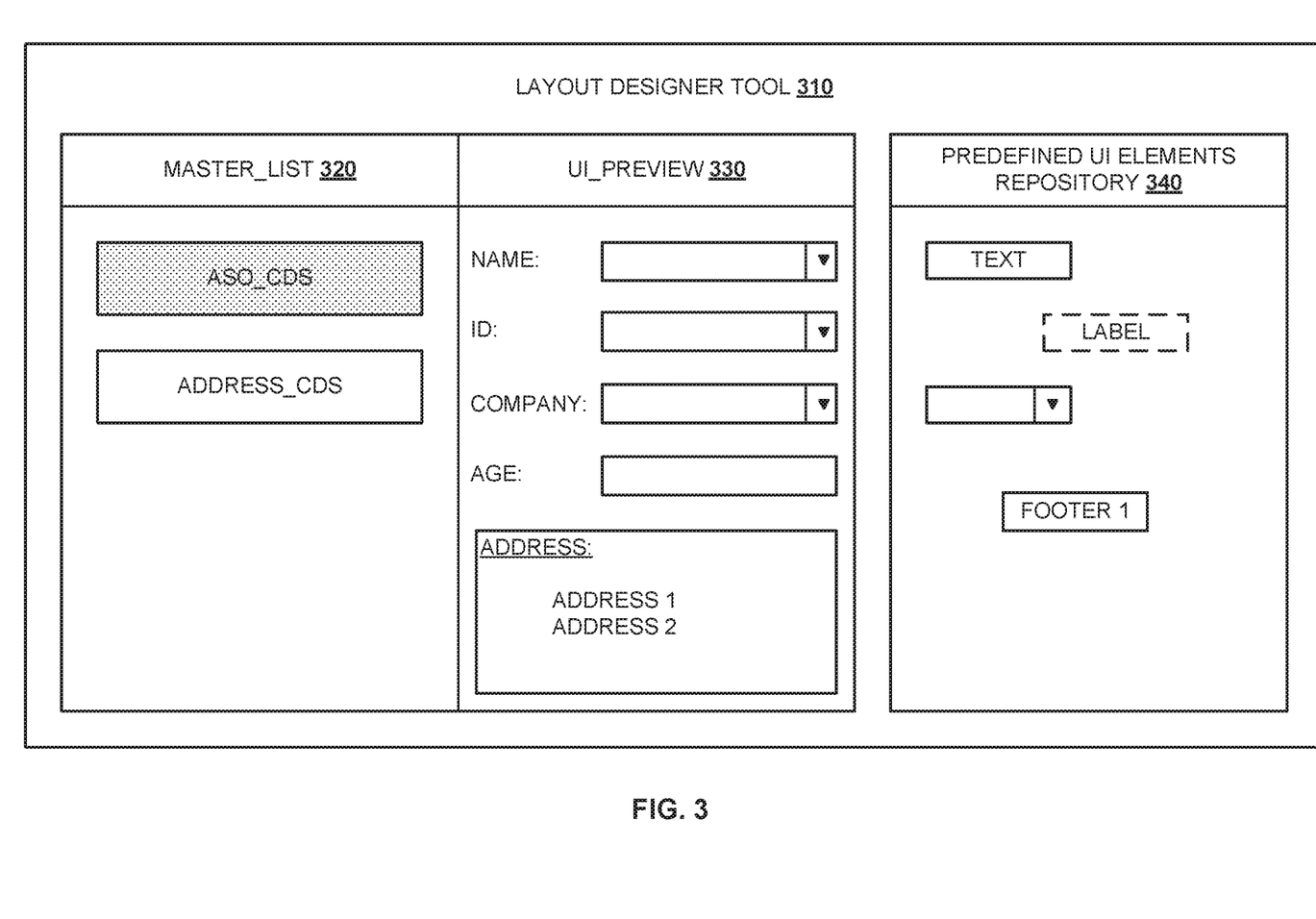
FIG. 3 illustrates an exemplarily layout designer tool for designing customized UI, according to an embodiment.

FIG. 3 illustrates an exemplarily layout designer tool 310 for creating customized UIs or application, according to an embodiment. In an embodiment, the layout designer tool 310 includes sections namely master_list 320, UI_preview 330, and predefined UI elements repository 340. The selected predefined views, e.g., the CDS views "ASO_CDS" and "ASO_ADDRESS_CDS", are displayed in the master_list 320. When the user selects any of the displayed predefined CDS view from the master_list 320, a default layout or a preview of a UI corresponding to the selected predefined CDS view is displayed in the section UI_preview 330. For example, if the CDS view "ASO_CDS" is selected in the master_list 320 (shown as dotted block), then UI preview of the predefined "ASO_CDS" is displayed in the UI_preview 330. The user can view the default layout or UI (e.g., in the UI_preview 330) of the selected predefined CDS view and can edit or customize the default layout or UI as per their requirement. The layout designer tool 310 includes the predefined UI elements repository 340 from where the user can drag-and-drop the required UI elements to customize the default layout or UI. In an embodiment, the user may change labels, form field groups etc., to customize the default layout or UI. In an embodiment, if the selected view (in the master_list 320) is a root or parent view (i.e., has one or more child or associated views), then the predefined UI elements repository 340 may also include line item designer (not shown) to design line item within the UI to navigate to the one or more associated UIs of the associated CDS views (i.e., child CDS views) through the line item. In an embodiment, the line item may be a field, a row, a data, etc., with a hyperlink, within the UI of parent CDS view. In an embodiment, once the user customizes the UI, a pop-up might be displayed asking "value-help needs to be added to your UI." The value-help may be added to those UI elements that can have a value suggestion feature. For example, usually a drop-down menu has a value suggestion feature to suggest or display valid (predefined) values for the UI element. When the user selects (e.g., "YES") to add value-help to the customized UI, a list of probable UI elements or fields (e.g., which can have value-help) are displayed. The user may select one or more UI elements or fields from the list of UI elements to which value-help is to be added. In an embodiment, input boxes may be provided corresponding to the UI elements or fields (for which value-help is to be added) to enter the name of object, CDS view, or check-table to be associated with the UI elements or fields and from which the values are to be fetched or retrieved. Once the value-help is provided and the UI is customized, the user may finalize the changes (e.g., by clicking on "finish or finalize" button). Upon finalizing the customized UI, the CDS view generator (e.g., the CDS view generator 120 of FIG. 1) generates the CDS view, including generic annotations, UI annotations, and/or value-help annotations and associations, for the customized UI.

Figure 4:
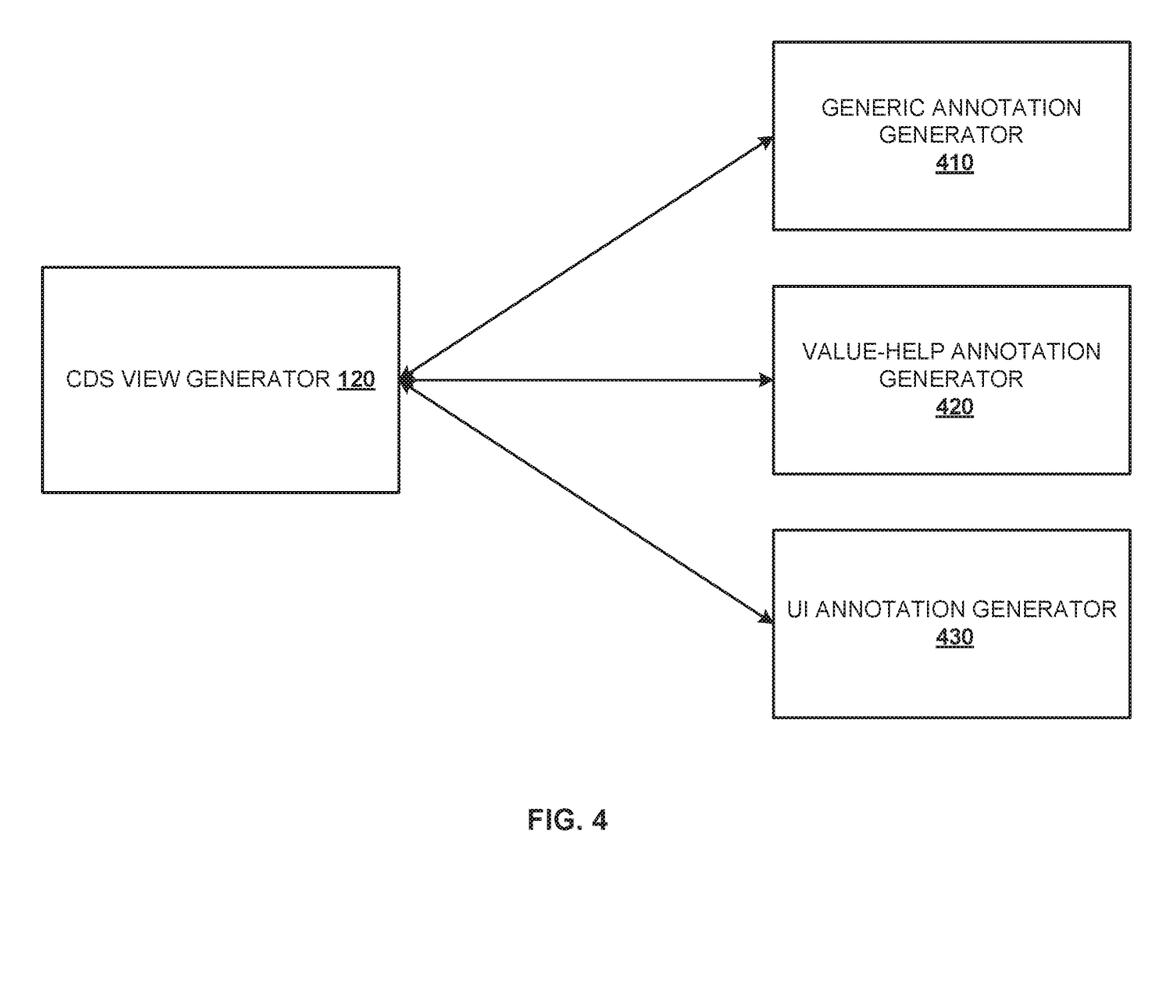
FIG. 4 illustrates various annotation generators coupled to the CDS view generator to generate CDS view including various annotations for the customized UI, according to an embodiment.

FIG. 4 illustrates CDS view generator 120 coupled to various annotation generators to generate CDS view including various annotations and associations for the customized UI, according to an embodiment. The CDS view generator 120 may be coupled to generic annotation generator 410, value-help annotation generator 420, and UI annotation generator 430. In an embodiment, the generic annotation generator 410, the value-help annotation generator 420, and the UI annotation generator 430 may be a part of the CDS view generator 120. The generic annotation generator 410 reads the generic or basic features or properties of the object (e.g., whether the UI (representing object) is editable or not) through the customized UI and then generates basic or generic annotations related to the customized UI (e.g., @object.editEnabled: True). The value-help annotation generator 420 identifies the UI elements or fields that has value-help feature and their association with the check tables (e.g., label "ID" has value-help feature and associated with the table "ASO_ID" including IDs of all possible associate partners) to generate value-help annotations related to UI element that has value-help and association with the check table (e.g., @object.foreignKeyAssociation: ASO_ID). The UI annotation generator 430 generates UI annotation for each of the UI elements describing its visual properties (e.g., label, text, hidden, visible, etc.) and its position on the UI such as label for UI element (e.g., @UI.fieldgroup.Label: NAME). The annotation generators 410-430 collect the annotation information by analysing the user designed or customized UI. In an embodiment, the CDS view generator 120 reads the generated generic annotations, UI annotations, and/or value-help annotations and associations to generate the CDS view (e.g., including the generic annotations, the UI annotations, and/or the value-help annotations) for the customized UI. The generated CDS view is stored in the database (e.g., the database 130 of FIG. 1). In an embodiment, the generated CDS view is associated with OData service. The CDS view including its annotations may be read or accessed through the OData service. Generally, the CDS view is read through the OData service to generate and render UI corresponding to the CDS view.

Figure 5:
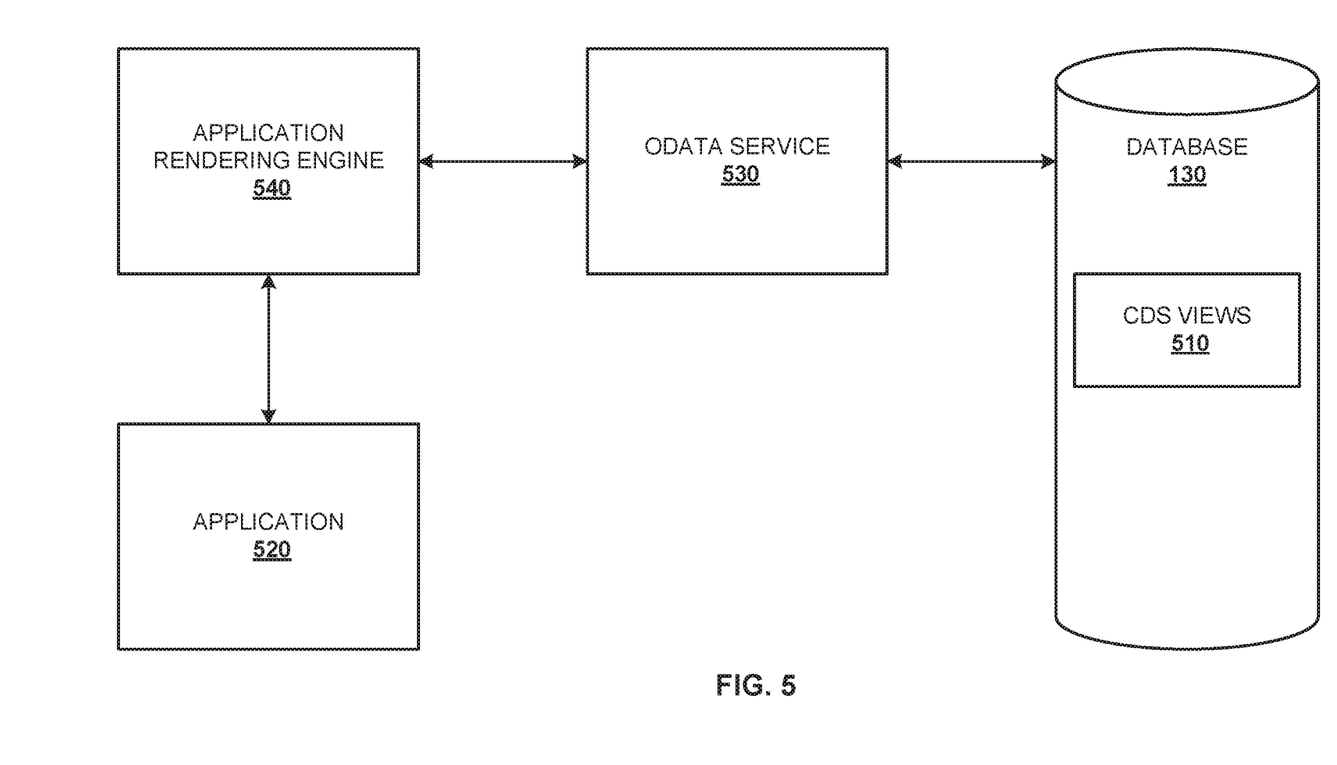
FIG. 5 illustrates CDS views of an application accessed and read through OData service to generate and render the application, according to an embodiment.

FIG. 5 illustrates CDS views 510 of an application 520 accessed and read through OData service 530 to generate and render the application 520, according to an embodiment. The application 520 is a user defined application which includes one or more user designed or customized UIs. The UIs may be in hierarchical order. e.g., first UI of the application 520 may represent an object such as "associate partner" and is linked to another object page or second UI representing an object "address". The CDS views 510 of the application 520 which is automatically generated and stored in the database 130 may be in a similar hierarchical order. Any external module, engine, or application can access or read the CDS views 510 of the application 520 through the OData service 530 (e.g., for rendering the application 520). During runtime, when a request is received to render the application 520, application rendering engine 540 accesses the CDS views 510 of the application 520 through the OData service 530, reads the CDS views 510 including the annotations, and renders the application 520.

Figure 6:
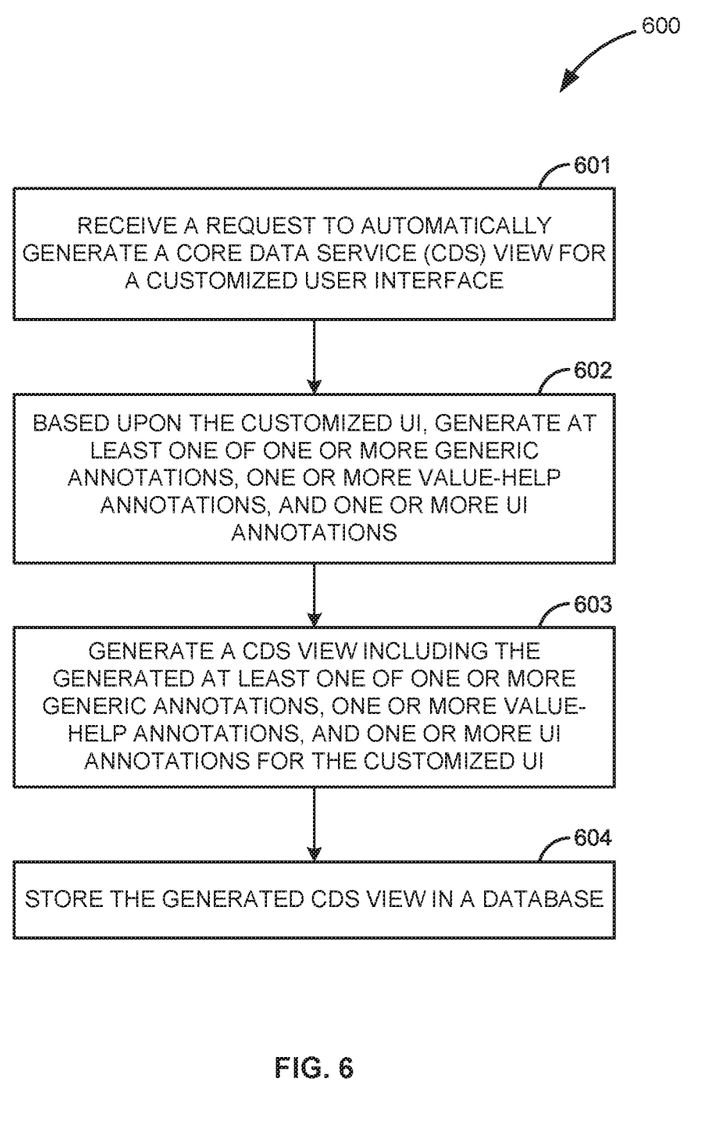
FIG. 6 is a flowchart illustrating method for automatically generating a core data service (CDS) view for customized user interface (UI), according to an embodiment.

FIG. 6 is a flowchart illustrating process 600 to automatically generate a core data service (CDS) view based on customized user interface (UI), according to an embodiment. At 601, a request to automatically generate a CDS view for a customized user interfaces (UI) is received. In an embodiment, a layout designer tool (e.g., the layout designer tool 310 of FIG. 3) for creating a customized UI is rendered. In an embodiment, the customized UI represents an object. The customized UI may be created from scratch or may be created using predefined templates or CDS views. The process of creating customized UI, e.g., using predefined CDS views, may be as described with reference to FIG. 7. At 602, based upon the created customized UI, at least one of one or more generic annotations, one or more value-help annotations, and one or more UI annotations are generated. The one or more generic annotations describe generic metadata of the object represented by the customized UI, the one or more value-help annotations refer to tables having predefined values for one or more UI elements of the customized UI, and the one or more UI annotations describe properties of the one or more UI elements of the customized UI. At 603, the CDS view is generated including the generated at least one of the one or more generic annotations, the one or more value-help annotations, and the one or more UI annotations. At 604, the generated CDS view is stored in a database (e.g., the database 130 of FIG. 1). In an embodiment, the generated CDS view is stored with reference to the customized UI for which it is generated. The generated CDS view may be used, later, e.g., for recreating and/or rendering the customized UI.

Figure 7:
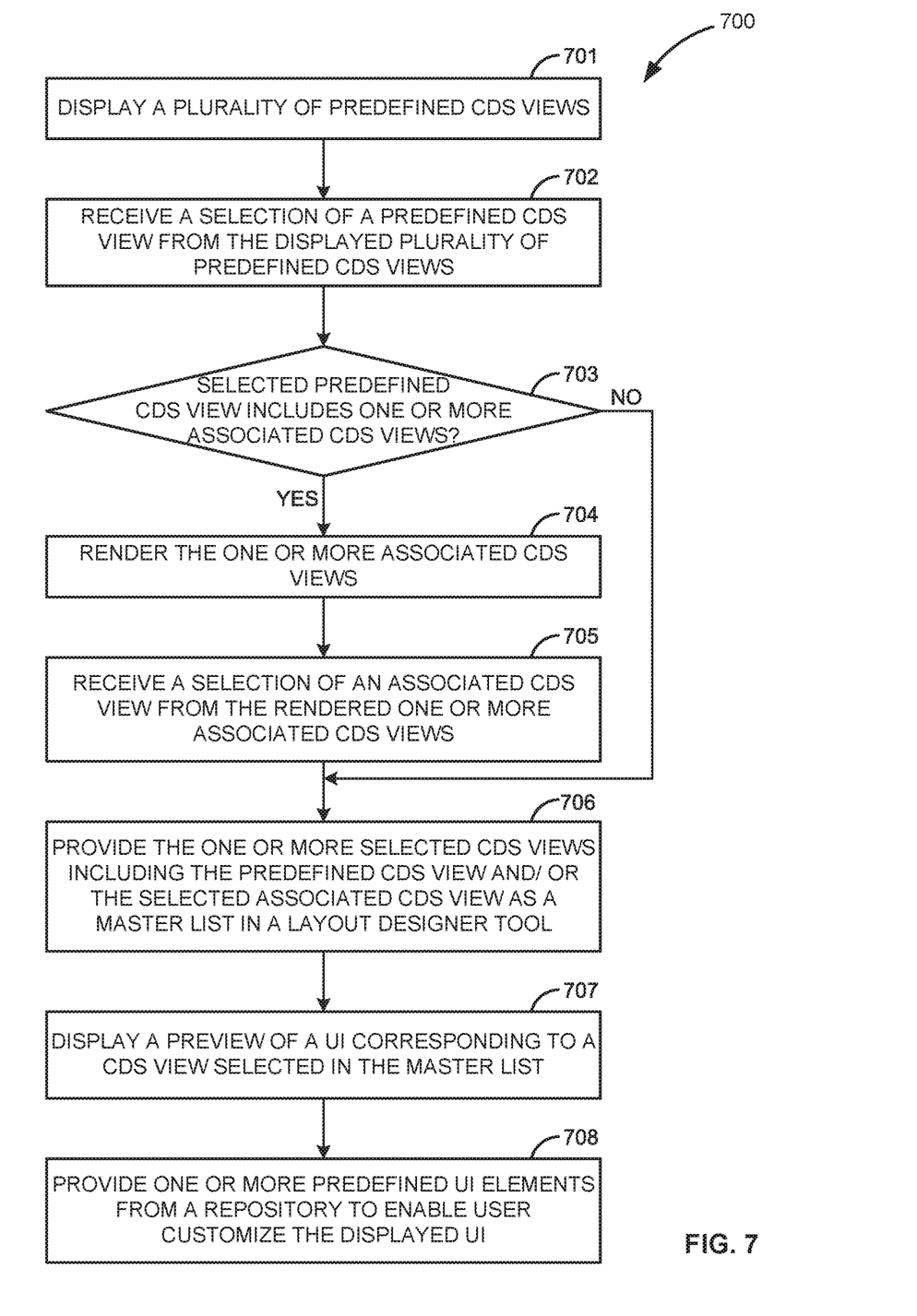
FIG. 7 is a flowchart illustrating method for creating the customized UI, according to an embodiment.

FIG. 7 is a flowchart illustrating process 700 to create customized UI using predefined CDS views, according to an embodiment. The predefined CDS views provide generic layout for designing and creating customized UIs. At 701, a plurality of predefined CDS views are displayed. At 702, a selection of a predefined CDS view from the plurality of displayed CDS views is received. The selected predefined CDS view comprises a predefined layout including the one or more generic annotations. At 703, it is determined whether the selected predefined CDS view includes one or more associations or associated CDS views. When the selected predefined CDS view includes the one or more associated CDS views (703: YES), the one or more associated CDS views is rendered at 704. At 705, a selection of an associated CDS view from the rendered one or more associated CDS views is received. At 706, the one or more selected CDS views including the predefined CDS view and/or the selected associated CDS view is provided as a master list in a layout designer tool (e.g., the layout designer tool 310 of FIG. 3). At 707, in response to a selection of a CDS view in the master list, a preview of a UI corresponding to the CDS view selected in the master list is displayed. In an embodiment, the preview of the UI is displayed in a UI preview section (UI_preview 330 of FIG. 3) adjacent the master list. At 708, one or more predefined UI elements are provided from a repository to enable a user to customize the UI displayed in the UI preview section to create the customized UI.

Figure 8:
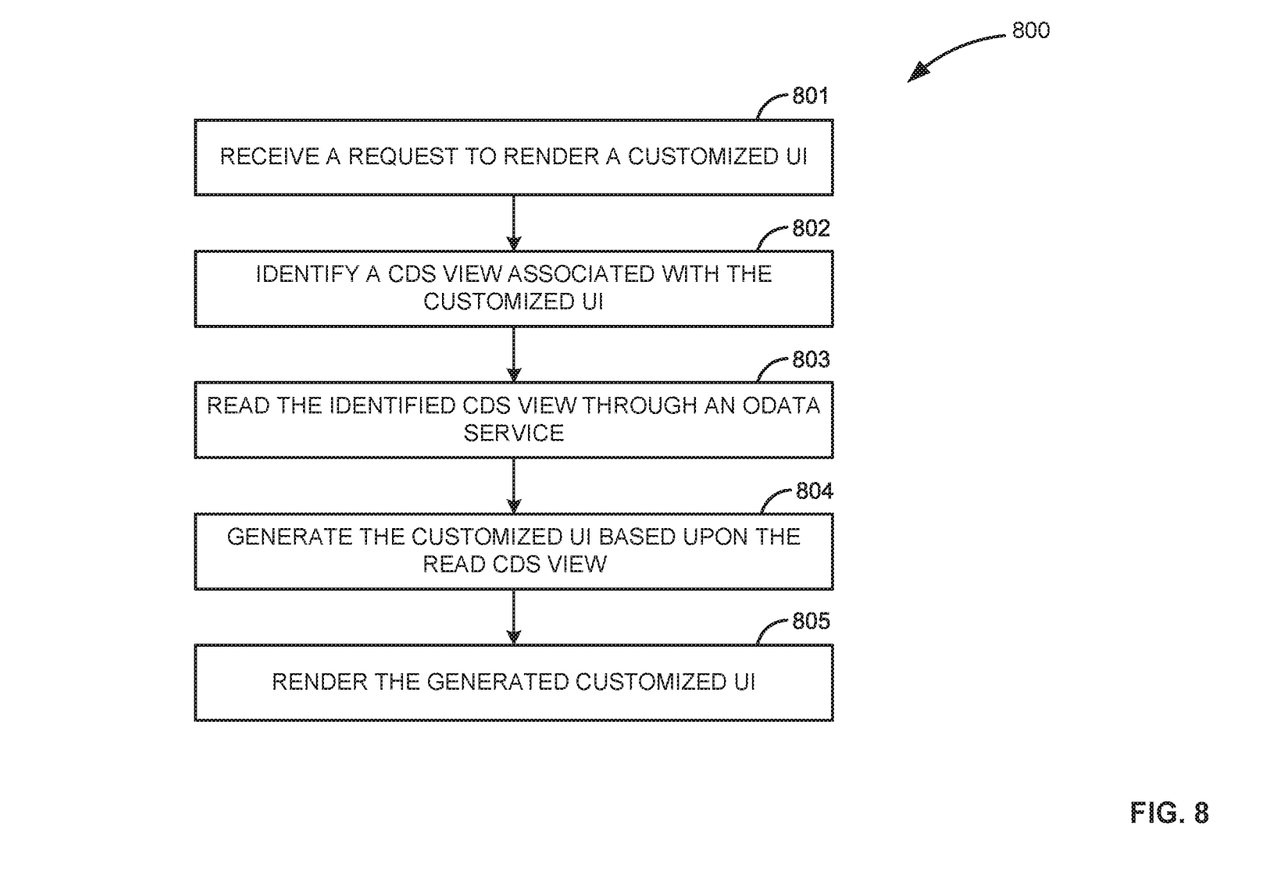
FIG. 8 is a flowchart illustrating method for rendering the customized UI based upon its generated CDS view, according to an embodiment.

FIG. 8 is a flowchart illustrating process 800 to render a customized UI based upon its CDS view, according to an embodiment. At 801, a request to render the customized UI is received. At 802, a CDS view associated with the customized UI is identified. In an embodiment, identifying the CDS view associated with the customized UI refers to searching the CDS views stored within the database (e.g., the database 130 of FIG. 1) for the customized UI. In an embodiment, OData service associated with the identified CDS view is identified. The OData service enables an external and/or internal application(s) to access and read the CDS view and its annotations including at least one of one or more generic annotations, the one or more value-help annotations, and the one or more UI annotations. At 803, the identified CDS view including the at least one of one or more generic annotations, the one or more value-help annotations, and the one or more UI annotations are read through the identified OData service. At 804, the customized UI is generated based upon the read CDS view. At 805, the generated customized UI is displayed or rendered.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices: magneto-optical media, and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
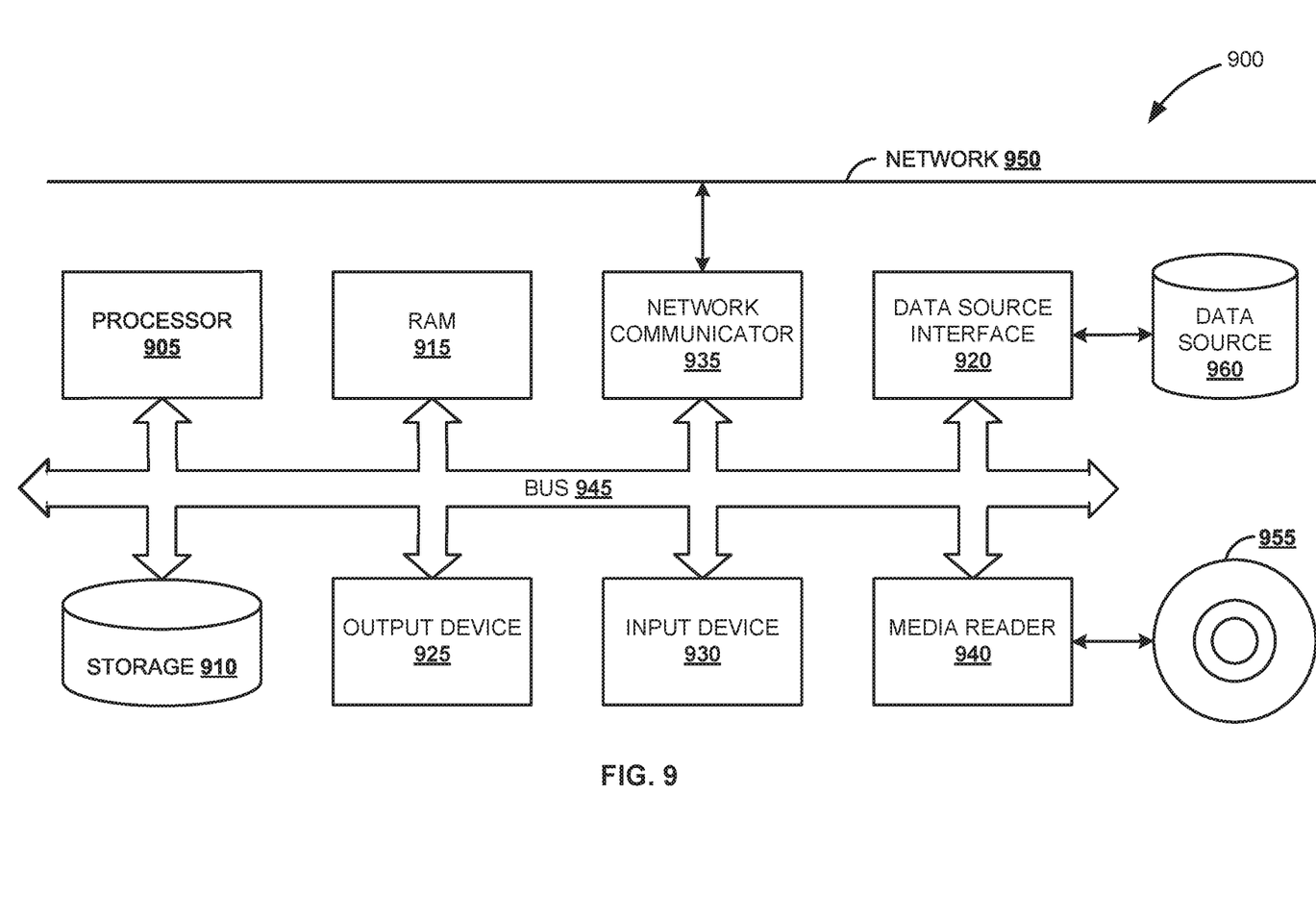
FIG. 9 is a block diagram illustrating an exemplary computer system, according to an embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. The output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments, the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
   receive a request to automatically generate a core data service (CDS) view for a customized user interface (UI), wherein the customized UI represents an object;
   based upon the customized UI, generate at least one of:
      one or more generic annotations describing generic metadata of the object;
      one or more value-help annotations referring to tables having predefined values for one or more UI elements of the customized UI; and
      one or more UI annotations describing properties of the one or more UI elements of the customized UI;
   generate the CDS view including the generated at least one of the one or more generic annotations, the one or more value-help annotations, and the one or more UI annotations; and
   store the generated CDS view in a database;
   wherein the customized UI is generated by:
      receiving a selection of a predefined CDS view comprising a predefined layout including the one or more generic annotations;
      determining whether the predefined CDS view includes one or more associated CDS views;
      upon determining that the predefined CDS view includes the one or more associated CDS views, rendering the one or more associated CDS views;
      receiving a selection of an associated CDS view from the rendered one or more associated CDS views;
      providing the one or more selected CDS views including the predefined CDS view and the selected associated CDS view as a master list in a layout designer tool;
      in response to selection of a CDS view from the provided one or more CDS views in the master list, displaying a preview of a UI corresponding to the CDS view selected in the master list; and
      providing one or more predefined UI elements from a repository to customize the UI whose preview is displayed to create the customized UI.

2. The non-transitory computer readable medium of claim 1, wherein the one or more value-help annotations include:
   reference of the one or more UI elements which has value suggestion feature; and
   association of the one or more UI elements having value suggestion feature with respective table from which the values are retrieved.

3. The non-transitory computer readable medium of claim 1, wherein the properties of the one or more UI elements include one or more visual properties of the one or more UI elements of the customized UI.

4. The non-transitory computer readable medium of claim 1, wherein the instructions, which when executed by a computer, causes the computer to:
   determine whether a value-help is to be added to the customized UI; and
   upon determining that the value-help is to be added:
      identify a UI element for which the value-help is to be added;
      identify a table to be associated with the identified UI element; and associate the identified table with the identified UI element.

5. The non-transitory computer readable medium of claim 1, wherein the instructions, which when executed by a computer, cause the computer to:
receive an OData service to be associated with the generated CDS view; and
associate the OData service with the generated CDS view to enable at least one of an external and internal application to access and read the generated CDS view and its annotations including at least one of one or more generic annotations, the one or more value-help annotations, and the one or more UI annotations through the OData service.

6. The non-transitory computer readable medium of claim 5, wherein the instructions, which when executed by a computer, cause the computer to:
receive a request to render the customized UI;
identifying the CDS view associated with the customized UI;
reading the identified CDS view including the at least one of one or more generic annotations, the one or more value-help annotations, and the one or more UI annotations through the OData service;
generate the customized UI based upon the read CDS view; and
rendering the generated customized UI.

7. A computer-implemented method comprising:
receiving a request to automatically generate a core data service (CDS) view for a customized user interface (UI), wherein the customized UI represents an object;
based upon the customized UI, generating at least one of:
one or more generic annotations describing generic metadata of the object;
one or more value-help annotations referring to tables having predefined values for one or more UI elements of the customized UI; and
one or more UI annotations describing properties of the one or more UI elements of the customized UI;
generating the CDS view including the generated at least one of the one or more generic annotations, the one or more value-help annotations, and the one or more UI annotations; and
storing the generated CDS view in a database;
wherein the customized UI is generated by:
receiving a selection of a predefined CDS view comprising a predefined layout including the one or more generic annotations;
determining whether the predefined CDS view includes one or more associated CDS views;
upon determining that the predefined CDS view includes the one or more associated CDS views, rendering the one or more associated CDS views;
receiving a selection of an associated CDS view from the rendered one or more associated CDS views;
providing the one or more selected CDS views including the predefined CDS view and the selected associated CDS view as a master list in a layout designer tool; in response to selection of a CDS view from the provided one or more CDS views in the master list, displaying a preview of a UI corresponding to the CDS view selected in the master list; and
providing one or more predefined UI elements from a repository to customize the UI whose preview is displayed to create the customized UI.

8. The method of claim 7 further comprising:
determining whether a value-help is to be added to the customized UI; and
upon determining that the value-help is to be added:
identify a UI element for which the value-help is to be added;
identify a table to be associated with the identified UI element; and
associate the identified table with the identified UI element.

9. The method of claim 7 further comprising:
receiving an OData service to be associated with the generated CDS view; and
associating the OData service with the generated CDS view to enable at least one of an external and internal application to access and read the generated CDS view and its annotations including at least one of one or more generic annotations, the one or more value-help annotations, and the one or more UI annotations through the OData service.

10. The method of claim 9 further comprising:
receiving a request to render the customized UI;
identifying the CDS view associated with the customized UI;
reading the identified CDS view including the at least one of one or more generic annotations, the one or more value-help annotations, and the one or more UI annotations through the OData service;
generating the customized UI based upon the read CDS view; and
rendering the generated customized UI.

11. A computer system comprising:
at least one memory to store executable instructions; and
at least one processor communicatively coupled to the at least one memory, the at least one processor configured to execute the executable instructions to:
receive a request to automatically generate a core data service (CDS) view for a customized user interface (UI), wherein the customized UI represents an object;
based upon the customized UI, generate at least one of:
one or more generic annotations describing generic metadata of the object;
one or more value-help annotations referring to tables having predefined values for one or more UI elements of the customized UI; and
one or more UI annotations describing properties of the one or more UI elements of the customized UI;
generate the CDS view including the generated at least one of the one or more generic annotations, the one or more value-help annotations, and the one or more UI annotations; and
store the generated CDS view in a database;
wherein the customized UI is generated by:
receiving a selection of a predefined CDS view comprising a predefined layout including the one or more generic annotations;
determining whether the predefined CDS view includes one or more associated CDS views;
upon determining that the predefined CDS view includes the one or more associated CDS views, rendering the one or more associated CDS views;
receiving a selection of an associated CDS view from the rendered one or more associated CDS views; and providing, by a layout designer tool:
the one or more selected CDS views including the predefined CDS view and the selected associated CDS view as a master list in the layout designer tool;
a UI preview section adjacent the master list and displaying a preview of a UI of corresponding to a CDS view selected in the master list section; and
a predefined UI elements repository providing a plurality of UI elements for customizing the displayed UI in the UI preview section to generate the customized UI.

12. The system of claim 11, wherein the one or more value-help annotations include:
reference of the one or more UI elements which has value suggestion feature; and
association of the one or more UI elements having value suggestion feature with respective table from which the values are retrieved.

13. The system of claim 11, wherein the properties of the one or more UI elements include one or more visual properties of the one or more UI elements of the customized UI.

14. The system of claim 11, wherein the plurality of UI elements are placed onto the displayed UI in the UI preview section using drag-and-drop operation.

15. The system of claim 11, wherein the at least one processor is further configured to execute the executable instructions to:
determine whether a value-help is to be added to the customized UI; and
upon determining that the value-help is to be added:
identify a UI element for which the value-help is to be added;
identify a table to be associated with the identified UI element; and
associate the identified table with the identified UI element.

16. The system of claim 12, wherein the at least one processor is further configured to execute the executable instructions to:
receive an OData service to be associated with the generated CDS view; and
associate the OData service with the generated CDS view to enable at least one of an external and internal application to access and read the generated CDS view and its annotations including at least one of one or more generic annotations, the one or more value-help annotations, and the one or more UI annotations through the OData service.

17. The system of claim 16, wherein the at least one processor is further configured to execute the executable instructions to:
receive a request to render the customized UI;
identify the CDS view associated with the customized UI;
reader the identified CDS view including the at least one of one or more generic annotations, the one or more value-help annotations, and the one or more UI annotations through the OData service;
generate the customized UI based upon the read CDS view; and
render the generated customized UI.

* * * * *